US010884644B2

(12) United States Patent
Rath et al.

(10) Patent No.: US 10,884,644 B2
(45) Date of Patent: Jan. 5, 2021

(54) DYNAMIC DISTRIBUTED DATA CLUSTERING

(71) Applicant: Amazon Technologies, Inc., Seattle, WA (US)

(72) Inventors: Timothy Andrew Rath, Des Moines, WA (US); Mustafa Ozan Ozen, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/021,701

(22) Filed: Jun. 28, 2018

(65) Prior Publication Data

US 2020/0004449 A1 Jan. 2, 2020

(51) Int. Cl.
*G06F 3/06* (2006.01)
*G06F 9/50* (2006.01)
*G06F 16/907* (2019.01)
*G06F 16/903* (2019.01)

(52) U.S. Cl.
CPC ............ *G06F 3/0644* (2013.01); *G06F 3/067* (2013.01); *G06F 3/0611* (2013.01); *G06F 9/5061* (2013.01); *G06F 16/903* (2019.01); *G06F 16/907* (2019.01)

(58) Field of Classification Search
CPC ...... G06F 3/0644; G06F 3/0611; G06F 3/067; G06F 16/907; G06F 16/903; G06F 9/5061
See application file for complete search history.

(56) References Cited

U.S. PATENT DOCUMENTS

| 7,299,239 | B1 | 11/2007 | Basu et al. | |
|---|---|---|---|---|
| 7,685,109 | B1 | 3/2010 | Ransil et al. | |
| 2006/0047902 | A1* | 3/2006 | Passerini | G06F 3/0611 711/114 |
| 2015/0134666 | A1* | 5/2015 | Gattiker | G06F 16/334 707/739 |

(Continued)

FOREIGN PATENT DOCUMENTS

WO 2015/070232 A1 5/2015

OTHER PUBLICATIONS

Anonymous, "Oracle—Having partitiion on all distinct values where new value can come", Online available at <https://stackoverflow.com/questions/15546423/having-partitiion-on-all-distinct-values-where-new-value-can-come/15547218#15547218>, Mar. 21, 2013, 1 page.

(Continued)

*Primary Examiner* — Nanci N Wong
(74) *Attorney, Agent, or Firm* — Nicholson De Vos Webster & Elliott LLP

(57) ABSTRACT

Techniques are described for clustering data at the point of ingestion for storage using scalable storage resources. The clustering techniques described herein are used to cluster time series data in a manner such that data that is likely to be queried together is localized to a same partition, or to a minimal set of partitions if the data set is large, where the partitions are mapped to physical storage resources where the data is to be stored for subsequent processing. Among other benefits, the clustered storage of the data at the physical storage resources can reduce an amount of data that needs to be filtered by many types of queries, thereby improving the performance of any applications or processes that rely on querying the data.

19 Claims, 10 Drawing Sheets

(56) References Cited

U.S. PATENT DOCUMENTS

2018/0246934 A1* 8/2018 Arye ................. G06F 16/24554
2018/0341606 A1* 11/2018 Bolkhovitin ............ G06F 3/061
2019/0286636 A1* 9/2019 Bedard ................. G06F 16/283

OTHER PUBLICATIONS

International Search Report and Written Opinion, PCT App. No. PCT/US2019/038728, dated Sep. 6, 2019, 14 pages.

* cited by examiner

DYNAMIC DISTRIBUTED DATA CLUSTERING

BACKGROUND

The number of computer-implemented systems and applications that involve collecting and analyzing time series data is on the rise. To store such data in a manner that is efficient for various types of data processing, an effective database clusters the data across both time and space (for example, such that data elements received near in time to one another are grouped together, and such that data elements sharing similar attribute values are grouped together). Among other benefits, the clustering of data in this way can significantly increase the performance of queries against the data by reducing an amount of data to be filtered when queries request similar types of data. This can in turn increase the responsiveness of data visualizations, dashboards, and any other uses of the data returned by such queries.

Most algorithms currently used to cluster such data assume that the data is stored in a single location, such as a non-distributed database. However, these algorithms are generally less efficient in distributed data storage environments, where a significant amount of data shuffling across a network can be required to cluster the data as desired. Thus, existing algorithms can be less useful for time series data collection and other situations where relatively large amounts of data are ingested over time to be stored in a distributed, scalable storage environment.

BRIEF DESCRIPTION OF DRAWINGS

Various embodiments in accordance with the present disclosure will be described with reference to the drawings, in which.

DETAILED DESCRIPTION

Figure 1:
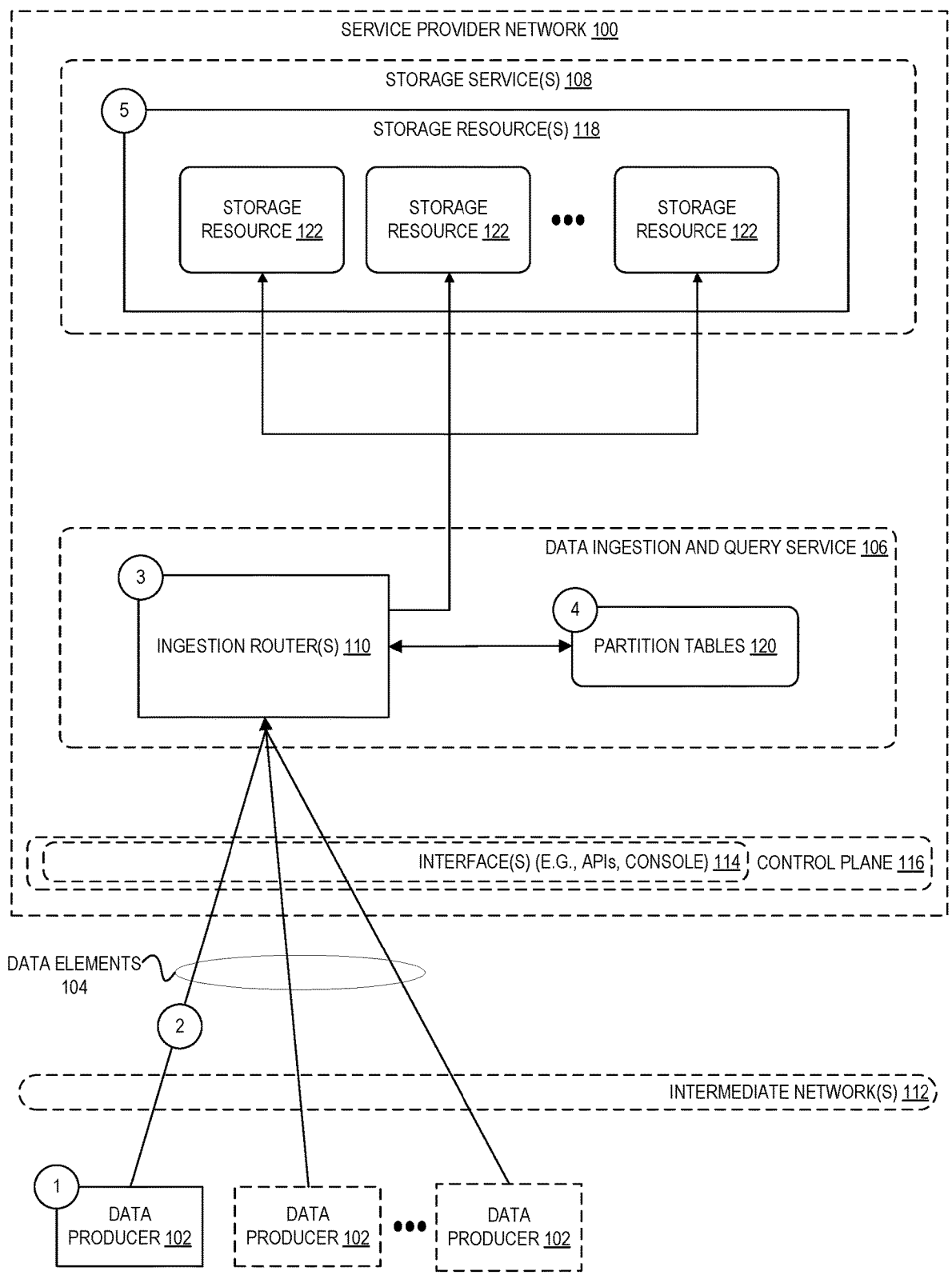
FIG. 1 is a diagram illustrating an environment for clustering data at the point of ingestion for storage using scalable storage resources according to some embodiments.

Various embodiments of methods, apparatus, systems, and non-transitory computer-readable storage media are described for clustering data at the point of ingestion for storage using scalable storage resources. In general, the clustering techniques described herein are used to cluster time series data in a manner such that data that is likely to be queried together is localized to a same partition, or to a minimal set of partitions if the data set is large, where the partitions are mapped to physical storage resources where the data is to be stored for subsequent querying or other types of data processing. Among other benefits, the clustered storage of the data at the physical storage resources can reduce an amount of data that needs to be filtered by many types of queries, thereby improving the performance of any applications or processes that rely on querying the data.

As indicated above, the number of computer-implemented systems and applications that involve collecting and analyzing data, and times series data in particular, is on the rise. To store such data in a manner that is efficient for querying and other types of analyses, an effective time series database clusters the data across both time and space. Most algorithms used to spatially cluster data assume that the data is stored in a non-distributed database and thus perform the clustering operations on the data stored there. However, these algorithms are typically less efficient in distributed storage environments, where use of the algorithms involves shuffling data across a network to achieve a desired clustering. According to embodiments described herein, a clustering algorithm is described that can be used during ingestion of the data for efficient storage in a distributed storage environment. The performance of the clustering at the point of ingestion largely avoids the need to move previously stored data around as the data landscape changes, thus making the algorithm more efficient in distributed storage environments. Although many of the examples provided herein relate to clustering time series data, and can involve using characteristics of time series data, the techniques described herein generally can be used with non-time series data and other contexts as well.

In an embodiment, the clustering of data is based on a hierarchy of attribute values associated with the data, also referred to as a data "drill path," where each successive level of the attribute hierarchy represents a greater level of data granularity. For example, if an application involves collecting and analyzing time series data generated by a collection of sensors distributed across the United States, each time series data point may be associated with a region attribute, a state attribute, a city attribute, and so forth. In this example, the state attribute represents a subgrouping of the region attribute, and the city attribute represents a subgrouping of the state attribute. As another example, if time series data is generated by an application monitoring the performance of compute instances in a datacenter, each time series data point may be associated with a hierarchy of attributes including a region attribute, a virtual private cloud (VPC) attribute, a subnet attribute, and so forth. In each of these examples, the attributes may represent groupings of data that are frequently queried together and thus represent data that it would be useful to have clustered together. For example, users might frequently generate queries for all sensor data in the "Northeast" region, or for performance information for compute instances in a particular VPC, and thus an efficient data storage solution for this data clusters the data according to these attribute groups.

According to embodiments described herein, to cluster data at the point of ingestion in the manner described above, a set of partition tables are generated corresponding to the attributes of an attribute hierarchy associated with the data to be collected. Each partition table includes a set of partitions to which particular attribute values for the corresponding attributes can be assigned. As data is received, the partition tables are used to spatially organize the data based on the actual attribute values observed in the data, as described in more detail hereinafter. At a high level, as time series data is ingested, the data is logically mapped to an ordered range of values associated with the partition tables, and the partitions can be mapped to physical storage resources depending on throughput observed for the various partitions.

In some embodiments, the data collected by a data ingestion system can also be organized based on a life-cycle of the data, such that various query patterns are supported at the lowest possible cost point. For example, queries that are used to troubleshoot problems in a datacenter in real-time may have significantly different requirements for latency, throughput, and necessary query expressiveness than is required for queries used to generate trend analyses across a year or more worth of data. For these reasons and others, embodiments described herein enable data to be transitioned across different types of storage resources over time depending on how the data is to be accessed.

FIG. 1 is a diagram illustrating an environment for clustering data at the point of ingestion for storage using scalable storage resources according to some embodiments. In the example of FIG. 1, a plurality of data producers 102 generate data elements 104 (for example, time series data points) that are sent to and clustered by a data ingestion router 110 of data ingestion and query service 106 at a service provider network 100. Each of the data producers 102 generally can be any type of hardware- or software-based component that generates time series or other types of data such as, for example, sensors that monitor and record physical conditions of an environment in which the sensors are located, monitoring software that monitors the performance and operation of various computing resources in a datacenter, and the like. The data producers 102 can be co-located near one another in a similar geographic location, or spread across a large geographic area. Although many of the examples described herein involve data producers 102 that generate time series data, the data ingestion and query service 106 can also be used for non-time series data that is similarly associated with one or more grouping attributes that can be used to cluster the data.

A provider network 100 provides users with the ability to utilize one or more of a variety of types of computing-related resources such as compute resources (for example, executing virtual machine (VM) instances or containers, executing batch jobs, executing code without provisioning servers), data and storage resources (for example, object storage, block-level storage, data archival storage), network-related resources (for example, configuring virtual networks including groups of compute resources, content delivery networks (CDNs), Domain Name Service (DNS)), application resources (for example, databases, application build/deployment services), and so forth. These and other computing resources may be provided as services, such as a hardware virtualization service that can execute compute instances, a storage virtualization service that can store data objects, and so forth. The users (or "customers") of provider networks 100 may utilize one or more user accounts that are associated with a customer account, though these terms may be used somewhat interchangeably depending upon the context of use. Users may interact with a provider network 100 across one or more intermediate networks 112 (for example, the internet) via one or more interface(s) 114, such as through use of application programming interface (API) calls, via a console implemented as a website or application, and so forth. The interface(s) 114 may be part of, or serve as a frontend to, a control plane 116 of the provider network 100 that includes "backend" services supporting and enabling the services that may be more directly offered to customers.

To provide these and other computing resource services, service provider networks 100 often rely upon virtualization techniques. For example, virtualization technologies may be used to provide users the ability to control or utilize compute instances (for example, a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the service provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

As indicated above, it is desirable at times to collect and store data elements 104 generated by data producers 102 at storage resources 118 provided by one or more storage services 108 of a service provider network 100. Furthermore, it is often desirable to have the data be clustered in a way that improves the performance of queries and other data processing operations. In an embodiment, at circle "1" in FIG. 1, one or more data producers 102 generate data elements 104 to be collected and stored and, at circle "2," the data elements 104 is sent over one or more intermediate networks 112 to a data ingestion and query service 106 of a service provider network 100. Although many of the examples described herein involve the collection and processing of data by a service of a service provider network 100, in other embodiments, the data elements 104 can be collected and processed by any computing device configured to perform the clustering techniques described herein.

For example, consider a company that manages sensor devices installed at various locations across the country and that each generate time series data. The sensors may be located, for example, in cars and used to monitor and report performance information for various components of the cars, or may be located in various datacenters and used to monitor the performance of servers and other computing resources over time. In these example, the time series data elements 104 may include information periodically sampled and provided by the sensors, where each individual data point includes a data payload and is further associated with one or more data attributes stored in fields of the data or in any other format. As indicated above, the data attributes associated with the data elements can be related as a hierarchy of attributes that provide information about the data at varying levels of data granularity.

Figure 2:
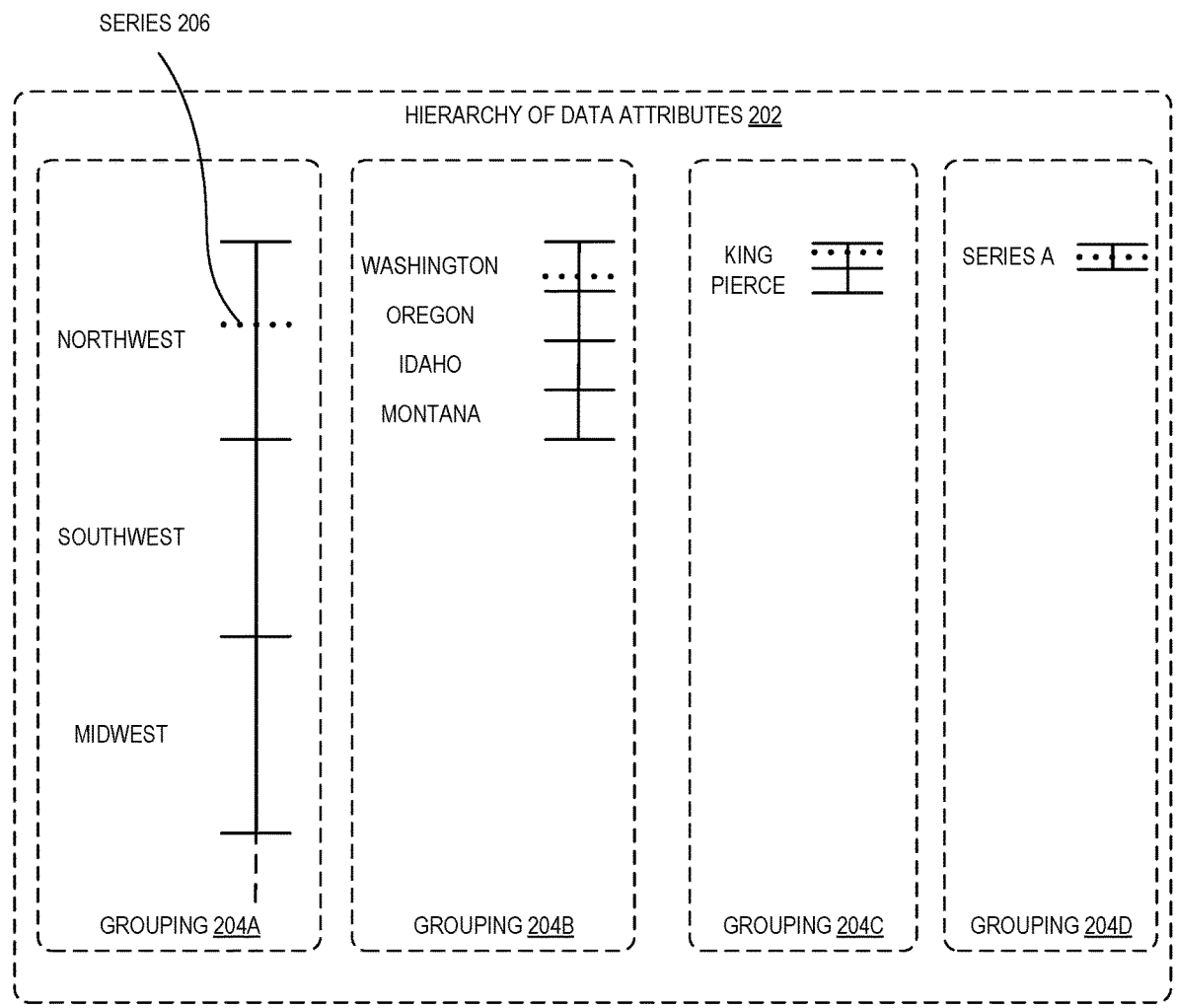
FIG. 2 illustrates an example hierarchy of grouping attributes associated with data elements (for example, time series data points) generated by a distributed collection of data producers according to some embodiments.

FIG. 2 is a diagram illustrating an example hierarchy of data attributes 202 associated time series data generated by a collection of sensors distributed across the United States. In the example shown in FIG. 2, data generated by the sensors is associated with attributes including a region, state, and county (represented by the groupings 204A-204D), where these attributes represent groupings of the data by which the data is likely to be queried or otherwise managed. Thus, the groupings 204A-204D shown in FIG. 2 collectively represent a desirable clustering of the data, such that data generated by a same sensor is spatially clustered together, data generated by sensors in a same county is clustered, data generated by sensors in same state are clustered, and data generated by sensors in a same region is clustered.

In FIG. 2, for example, the time series 206 corresponds to a time series generated by a particular sensor located in King county, which is located in Washington state in the Pacific Northwest region of the United States. Other sensors may be located in other regions, states, and counties, as indicated by the other sections of the lines representing each of the groupings 204A-204D. In this example, it is desirable for the time series data elements 104 to be clustered into a same spatial partition or a minimal set of partitions, similarly for data generated by other devices within King County, and for devices located within Washington state and devices in the Northwest region. For these reasons and others described herein, it is desirable to have a clustering algorithm that enables the data to be progressively clustered based on a hierarchy of grouping attributes, clustered across a spatial range such that each partition of the range that can be further segmented into additional sub-partitions, and such that the ranges associated with the partitions can be adjusted dynamically as the cardinality of attribute values changes, the ranges are dynamically adjusted to account for the throughput observed by the system, and the data can be queried efficiently based on the clustering.

Returning to FIG. 1, to configure a data ingestion and query service 106 to ingest and cluster time series data elements 104 generated by such data producers 102 as described above, a user can use an interface 114 (for example, a graphical user interface (GUI) or other type of interface) to create and configure storage resources 118 to store the data and to further provide input indicating that the user desires for the data to be stored at the resources to be clustered. In some embodiments, as part of this process, the user can provide input specifying a hierarchy of attributes associated with the data to be collected, where the hierarchy of attributes represent groupings of data that the user anticipates are likely to be queried together, as shown above in the example of FIG. 2. The specification of a data attribute hierarchy can include identifying one or more fields in the data that contain values for each of the data attributes, or provide input indicating how one or more of the data attributes can be derived from a field contained in the data. For example, a user might provide input indicating that a data attribute hierarchy for a collection of time series data to be collected is Region->State->County->City, and the user can further specify field names or other identifiers of locations where values for each of the attributes can be found in the data.

In other embodiments, a data ingestion and query service 106 can automatically identify some or all of a hierarchy of data attributes associated with time series data to be collected by monitoring and analyzing queries executed against similar data that is already stored. For example, the data ingestion and query service 106 or another component can monitor queries executed against the data and identify attributes of the data that are frequently grouped in the queries. As another example, a user or application may also define various "roll-ups" and other stored queries to be used in GUI dashboards or other applications, and the groupings used to create the stored queries can be used to determine a hierarchy of data attributes. In some embodiments, a data ingestion and query service 106 determines an attribute hierarchy by analyzing a query history to estimate a hierarchy that provides the best system performance (for example, in terms of latency or throughput). Furthermore, a data ingestion and query service 106 may adapt an attribute hierarchy after some amount of data has been ingested, at the expense of tracking additional metadata. In other examples, where a customer desires to collect data for which no particular attribute hierarchy is apparent, the service 106 can assign and use an arbitrary attribute hierarchy to cluster the data (for example, based on an alphabetical ordering of the attribute names or random ordering).

As indicated above, the data to be ingested ultimately is stored using storage resources 118. In an embodiment, each storage resource 122 of the storage resources 118 represents any type of data storage (in-memory databases, disk-optimized databases, data streams, files, and so forth), and can further include a tiered set of storage resources. For example, the most recently ingested data may be stored in fast, but expensive, in-memory databases. After a period of time, that data can be transferred to files for storage in less expensive storage provided by a different storage service 108. In an embodiment, a data ingestion and query service 106 provides a frontend that enables users to configure how the data collected by the service transitions from one type of storage to another.

In an embodiment, at circle "3," the data elements 104 are received by an ingestion router 110 and, at circle "4," the data is clustered using the partition tables 120. In an embodiment, the partition tables 120 can be stored at a storage location that is part of the data ingestion and query service 106, as shown in FIG. 1, or more generally can be stored at any storage location accessible to the ingestion router 110, including a storage location local to the router or using a storage location provided by a separate storage service 108 of the service provider network 100.

As indicated above, while an ingestion router 110 may have information indicating a hierarchy of data attributes associated with the time series data elements 104 that the router can use to cluster the data, an ingestion router 110 otherwise may be unaware of the set of possible values associated with each attribute of the attribute hierarchy for the data elements being ingested. For example, an ingestion router 110 may be aware that an attribute hierarchy includes a "state" attribute, but may not be aware that the data to be ingested includes the values "Washington," "California," "Texas," and so forth, for the "state" attribute. Thus, in an embodiment, a partition table 120 for the "state" attribute initially includes only a single partition representing an entire spatial range and an attribute value associated with the first data point received by the ingestion router 110 is assigned to the partition.

Figure 3:
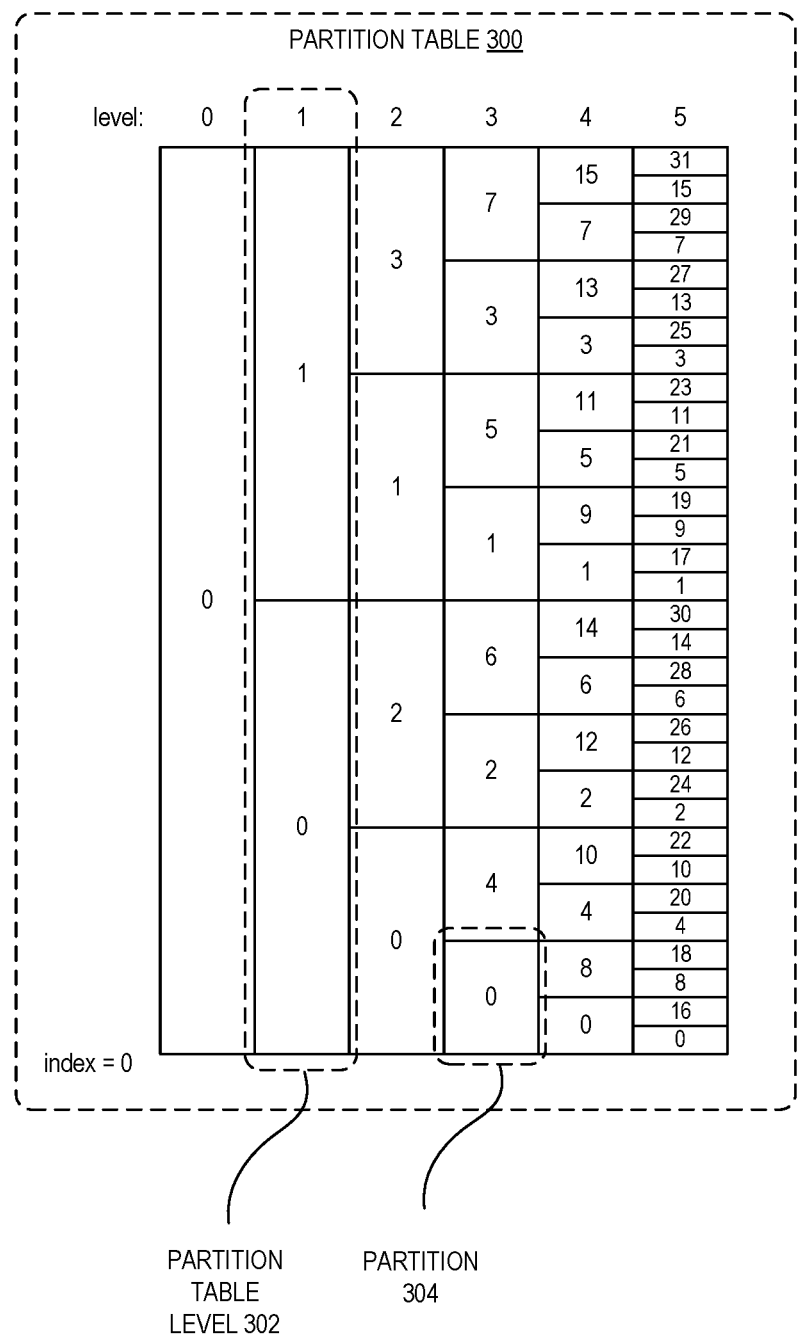
FIG. 3 is a diagram illustrating an example partition table comprising a plurality of levels, each level of the partition table including a set of partitions to which attribute values can be assigned, according to some embodiments.

FIG. 3 illustrates an example partition table 300 used to cluster time series data relative to one attribute of a hierarchy of attributes associated with the data. In an embodiment, a partition table 300 starts initially with a single partition that is associated with an entire spatial range associated with the table, the partition represented by the rectangular box labeled "0" at the far left side of the table. The spatial range associated with the partition table generally can be any range of ordered values, where the range is selected to be large enough to accommodate a number of unique attribute values expected to be observed in the data being collected. Each partition in the partition table 300 can be assigned to a single attribute value associated with the time series data being ingested and, when more unique attribute values are observed in the time series data than there are available partitions, the current level of the partition table 300 is segmented to create additional partitions to accommodate the additional attribute values. The additional partitions define a new segmentation of a total range of ordered values associated with the partition table. In the partition table 302 shown in FIG. 3, the "level" of the table corresponds to the number of times that the total spatial range associated with the partition table 300 has been re-segmented to create additional partitions (in the example shown in FIG. 3, the partition table 300 has been re-segmented five times resulting in six separate levels of partitions labeled "0"-"5").

For example, consider again a set of sensors generating time series data to be clustered based on an attribute hierarchy of "Region->State->County->City", and further assume that a partition table 302 is generated to cluster the data relative to the "Region" attribute. In this example, when an ingestion router 110 receives a first data point (for example, a data point indicating that it is associated with a sensor located in the "Southwest" region), the partition table 302 has only a single partition (the partition labeled "0" at level "0" of the table) to which the attribute value "Southwest" is assigned.

The ingestion router 110 is now aware of one attribute value for the "Region" attribute. However, it is otherwise unknown at this point whether any or all additional time series data received in the future will be associated with the same attribute value, that is, whether subsequently received time series data will be associated with only the "Southwest" region, only regions other than the "Southwest" region, or a mixture of both. Thus, the entire spatial partitioning range of the table 300 initially is allocated to data associated with the "Southwest" region. In an embodiment, the mapping between attribute values and partitions is maintained separately from the partition table 300, for example, in a value-to-partition mapping table initially storing only the mapping of partition "0" to the "Southwest" attribute value. In other examples, this mapping information can be stored as part of the partition table 302. As described in more detail below, each of the partitions of the partition table 302 is mapped to one or more physical storage resources used to store the data points associated with the partition. Thus, the first data point is stored at a physical storage resource to which the partition "0" is mapped. Referring to FIG. 1, for example, the data point is stored as part of a physical partition of one or more storage resources 122.

At some point in time after the first data point is received, a next data point is received and the ingestion router 110 identifies a value for the "Region" attribute associated with the data point. The ingestion router 110 determines whether the attribute value associated with the second data point is already assigned to an existing partition in the current level of the partition table 300. In this example, if the attribute value for the second data point is also the "Southwest" region, then the ingestion router 110 determines that there is a partition assigned to that attribute value, for example, by using the attribute value-to-partition mapping table to determine that the "Southwest" attribute value is assigned to the partition labeled "0".

If the attribute value associated with the second data point is instead different from the attribute value associated with the first data point (for example, if the second data point indicates that it is associated with a sensor in a "Northeast" region), then the ingestion router 110 first determines that the attribute value is not mapped to any slot in the current level of the partition table 302 (because there is currently only a single partition). The ingestion router 110 further determines that there is not an available partition in the current level to which the new attribute value can be assigned (again, because there is currently only the single partition labeled "0").

In an embodiment, each time the current level of the partition table 302 runs out of partitions to which a new attribute value can be assigned, a new level of the partition table 302 is created by bifurcating (or otherwise re-segmenting) the spatial range associated with each of the partitions in the current level. In the current example, there is only a single partition at level "0", so the next level "1" (shown as partition table level 302 in FIG. 3) is created by bifurcating the range associated with the partition labeled "0" into two new partitions labeled "0" and "1". A similar process is performed whenever the partition table 300 runs out of available partitions at level "1" (that is, when the data received so far is collectively associated with at least three unique "Region" attribute values), resulting in a set of four partitions labeled "0", "1", "2", and "3" in level "2" of the table. Thus, in the case where each level bifurcates the partitions of the previous level, the number of partitions at each level of the partition table 300 can be expressed as $2^{level}$.

In an embodiment, the partitions at a given level can be represented as an array having an index. As indicated above, unique attribute values are assigned to available partitions as the values are observed in data being ingested. The formulas provided below indicate which partition a given identifier is associated with depending on the current level of a partition table 302. As described in more detail below with respect to FIG. 4, the partition table 302 is used to cluster data relative to one attribute of a hierarchy of attributes and the ingestion router 110 maintains a separate partition table for each attribute of the hierarchy (for example, one partition table for the "Region" attribute, another partition table for the "State" attribute, another partition table for the "County" attribute, and so forth).

In one embodiment, the partitions are assigned for any given level of a partition table by the following set of formulas:

$$\text{index}(id, \text{level}) =$$

$$\begin{cases} firstLevel(id) = \text{level}: & firstIndex(id) \\ firstLevel(id) \ne \text{level}: & firstIndex(id) * 2^{level - firstLevel(id)} \end{cases}$$

$$firstIndex(id) = \begin{cases} id = 0 : 0 \\ id \ \% \ 2 = 1 : & id \\ id \ \% \ 2 = 0 : & id - 2^{firstLevel(id)-1} + 1 \end{cases}$$

$$firstLevel(id) = \begin{cases} id < 2 : & id \\ id \ge 2 : & \max(\text{level}) \mid id \ge 2^{level-1} \end{cases}$$

The formulas shown above are efficient to compute and, for example, result in partition assignments similar to those illustrated by table 302 in FIG. C. As the progression of table levels in FIG. C shows, each new level of the table assigns already existing attribute values to a subrange of its previous range. For example, the range associated with the partition 304 identified by label "0" at level "3" of the table 302 is associated with a subrange of the range associated with the partition labeled "0" at level "2" of the table. This trait of the partition tables is used in query planning, as described hereinafter.

As indicated above, each of the partitions in the table 302 is mapped to a subrange of a total spatial range associated with the table. In an embodiment, each partition is mapped to a subrange of the total range of ordered values based on the identifier (or index) of the partition and the current level of the table based on the following formulas:

$$slotStart = \text{index} * \frac{fullRangeMaxValue}{2^{level}}$$

$$slotEnd = (\text{index} + 1) * \frac{fullRangeMaxValue}{2^{level}} - 1$$

In an embodiment, an ingestion router 110 continues to ingest data points and to create new levels of the partition tables whenever a data point is received with an attribute value that is not mapped to a partition at the current level of the table and when there is not an available partition at the current level to which the attribute value can be mapped. As shown in FIG. 3, each time a new level of the table 302 is created, the initially empty partitions (that is, partitions to which no attribute value is currently assigned) are situated at every other partition position in the level (for example, the initially empty partitions at level "3" are labeled "4"-"7" and are situated at every other partition slot at that level). This spacing property of the partitions helps to maintain an approximately even packing of the data associated with each of the partitions.

Figure 4:
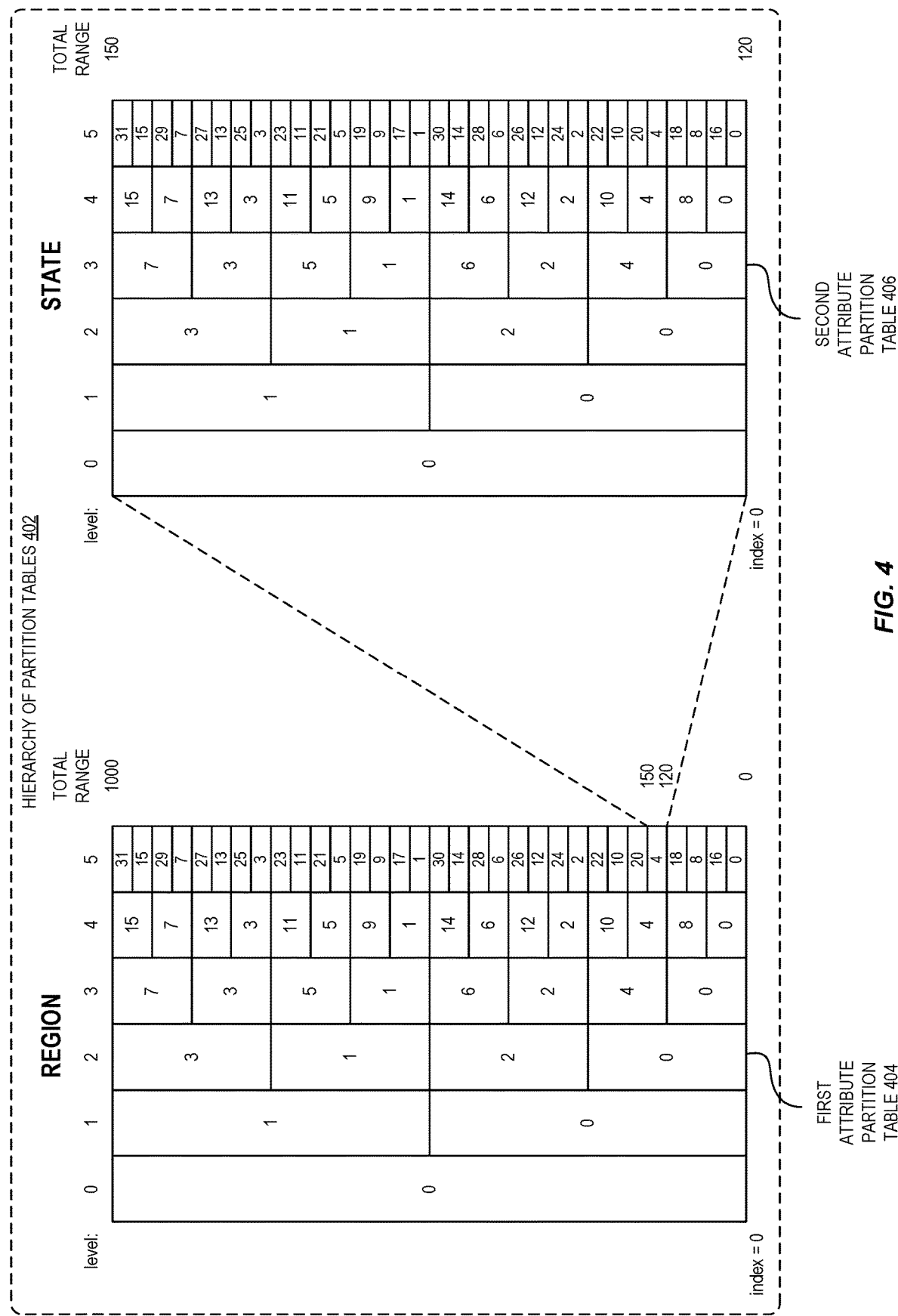
FIG. 4 is a diagram illustrating an example set of partition tables corresponding to multiple levels of a hierarchy of attributes associated with data to be clustered according to some embodiments.

As indicated above, the clustering of data associated with a hierarchy of attributes includes generating a separate partition table for each attribute of the hierarchy. FIG. 4 is a diagram illustrating example partition tables across multiple levels of a hierarchy of attributes associated with data to be clustered. The example shown in FIG. 4 includes a hierarchy of partition tables 402, including a first attribute partition table 404 corresponding to a "Region" attribute and a second attribute partition table 406 corresponding to a "State" attribute. In this example, the partition table for each of the attributes has been re-segmented five times, although in general the number of levels in each of the tables may be different depending on a number of unique attribute values observed at each level of the hierarchy. As illustrated by the hierarchy of partition tables 402, the second attribute partition table 406 is associated with a spatial range corresponding to one of the partitions in the first attribute partition table 404. For example, the partition labeled "4" in the first attribute partition table 404 may be assigned to the "Northwest" region and the second attribute partition table 406 may thus include a set of partitions clustering states that are within the "Northwest" region. The range values shown in FIG. 4 are provided for illustrative purposes only; in practical implementations, the ranges can involve much larger numbers depending on a number of attribute values to be clustered.

Figure 5:
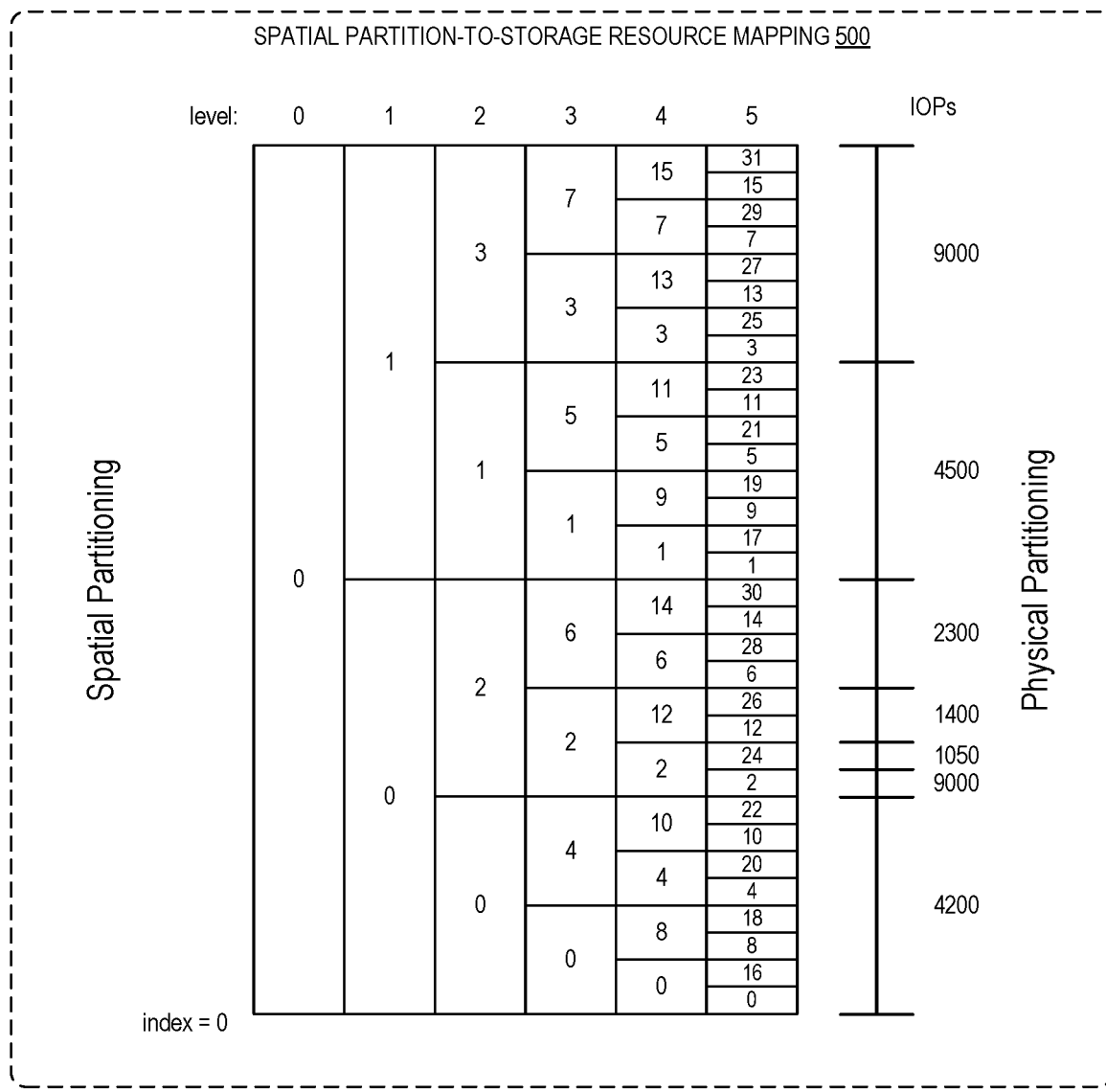
FIG. 5 is a diagram illustrating an example mapping between a spatial partitioning of ingested data and physical storage resources used to store the data according to some embodiments.

In an embodiment, the spatial partitioning of data collected by a data ingestion and query service 106 is mapped to a physical partitioning, where the collected data is actually stored across one or more storage resources at circle "5" in FIG. 1 (for example, across storage resources 118). FIG. 5 is a diagram illustrating an example mapping between a spatial partitioning of ingested data and physical storage resources used to store the data. For example, FIG. 5 includes a spatial partition-to-storage resource mapping 500, including a partition table creating a spatial organization of the data and a physical partitioning of the data based on throughput observed relative to the partitions of the table.

In an embodiment, to map the partitions to physical storage resources, the spatial ranges associated with the partitions are considered to be organizational and the mapping of the partitions to physical storage resources is managed separately from the spatial organization of the data. For example, the partitions collectively can be mapped to a set of database tables, data streams, or other types of storage resources. In an embodiment, rather than segmenting the physical space based on the organizational concepts, the physical space is segmented based on the observed throughput of the partitions. Thus, if an attribute is assigned to a spatial partition and this partition exhibits a greater share of the throughput relative to other partitions, the high throughput partition can be segmented across more physical resources to handle the throughput at an acceptable level.

In the example shown in FIG. 5, assume that the physical storage resources to which the data organized by the partition table are configured to maintain a maximum throughput per physical storage resource (for example, 10,000 input/output operations per second (IOPS)). In this case, the physical storage space (represented by the bar on the right side of the spatial partition-to-storage resource mapping 500) is segmented as needed in order to keep the maximum throughput at or below 10,000 IOPS per physical resource. Because the individual physical partitions are capable of being independently scaled, these partitions can be adjusted after changes to the spatial range, as needed. In the example of FIG. 5, if the attribute value "Northwest" is assigned to the partition labeled "2," and this partition is particularly active, the partition may receive 9,000 IOPS, while other partitions may share a much smaller amount of resources. In this manner, the data is organized both spatially for querying optimization and physically for throughput optimization as the data is being ingested. In other embodiments, physical storage resources can be mapped to a set of partitions in a partition table based on an even distribution of the physical storage resources to the partitions. For example, for partition tables where the throughput for various parts of the table is relatively uniform, an even distribution of the physical storage resources can be used since each partition is associated with approximately a same number of elements.

As indicated above, the data can also be stored across multiple storage tiers each having different performance characteristics. For example, recently ingested data initially can be stored at a "hot" tier comprising in-memory databases or other high performance datastores to support queries at a high level of performance. The storage of the data can further include generating one or more pre-aggregations of the data that work in streaming fashion such that stream processors are doing streaming aggregation and periodically reporting those aggregations having a smaller data size relative to the entire set of data from which the aggregations are computed. A next storage layer can include a "cold" tier where the file sizes used to the store the data are optimized with the tradeoff of slower query times.

In an embodiment, the partition tables 120 created by the ingestion router 110 can be used to process queries against the data stored at the storage resources 118. For example, a query might specify a time range ("the last five minutes", "from June 1 to June 3," and so forth) and one or more attributes used to filter data of interest ("all data in the Northwest region," "all data in Seattle and Dallas," and so forth). In this example, the relevant partition tables 120 can be analyzed to find the level of the table that corresponds to the beginning time of the query based on the data associated with each level indicating when level was created. If the attribute value of a query is not assigned to any of the partitions of the level associated with the start time (meaning no data for the attribute value was received yet), then the query can proceed to the first level of the table that includes a partition with relevant data. In an embodiment, the same formulas described above can be used to identify what is the first level in a table for any given identifier. When a query is received with a time range, a query router can identify an oldest level of the table that the query defines which corresponds to a superset of the requested data.

Figure 6:
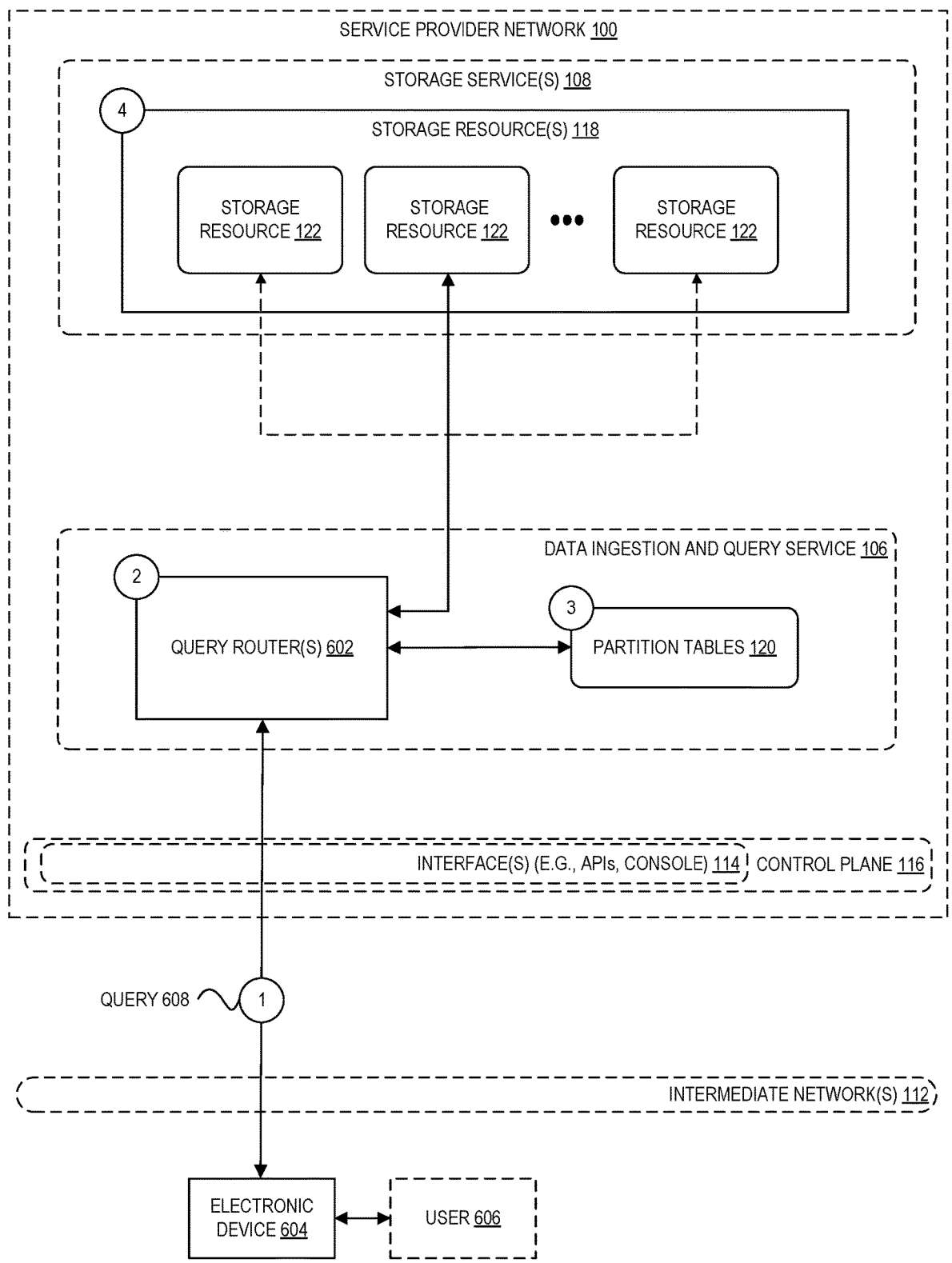
FIG. 6 is a diagram illustrating an environment for using a set of partition tables to process a query according to some embodiments.

FIG. 6 is a diagram illustrating an environment for using a set of partition tables to process a query according to some embodiments. As indicated above, it is desirable at times for users to query the data stored by a data ingestion and query service 106. At circle "1" in FIG. 6, for example, a user 606 uses an electronic device 604 (for example, a laptop, desktop computer, or the like) to generate a query 608 sent to a query router 602 of the data ingestion and query service 106. The user 606 can generate the query 608 using an API 114 or any other type of interface for communicating with a query router 602. Although the example shown in FIG. 6 illustrates a user-generated query generated by an electronic device 604 that is external to the service provider network 100, in other examples a query 608 can be generated by a user or other component that is internal or external to the service provider network 100.

At circle "2" in FIG. 6, a query router 602 receives the query 608 and, at circle "3," uses the partition tables 120 to identify one or more storage resources 118 storing data requested by the query. As indicated above, a query router 602 can use parameters associated with the query (for example, one or more attribute values and time ranges) to identify one or more partitions of the partition tables 120 to which the query relates (for example, by similarly using the equations described above used to identify partitions for data points being ingested). In an embodiment, at circle "4," the query router 602 can use the identified storage resources to locate data satisfying the query, union the results from each storage resource searched, and return a response to the requesting device.

Figure 7:
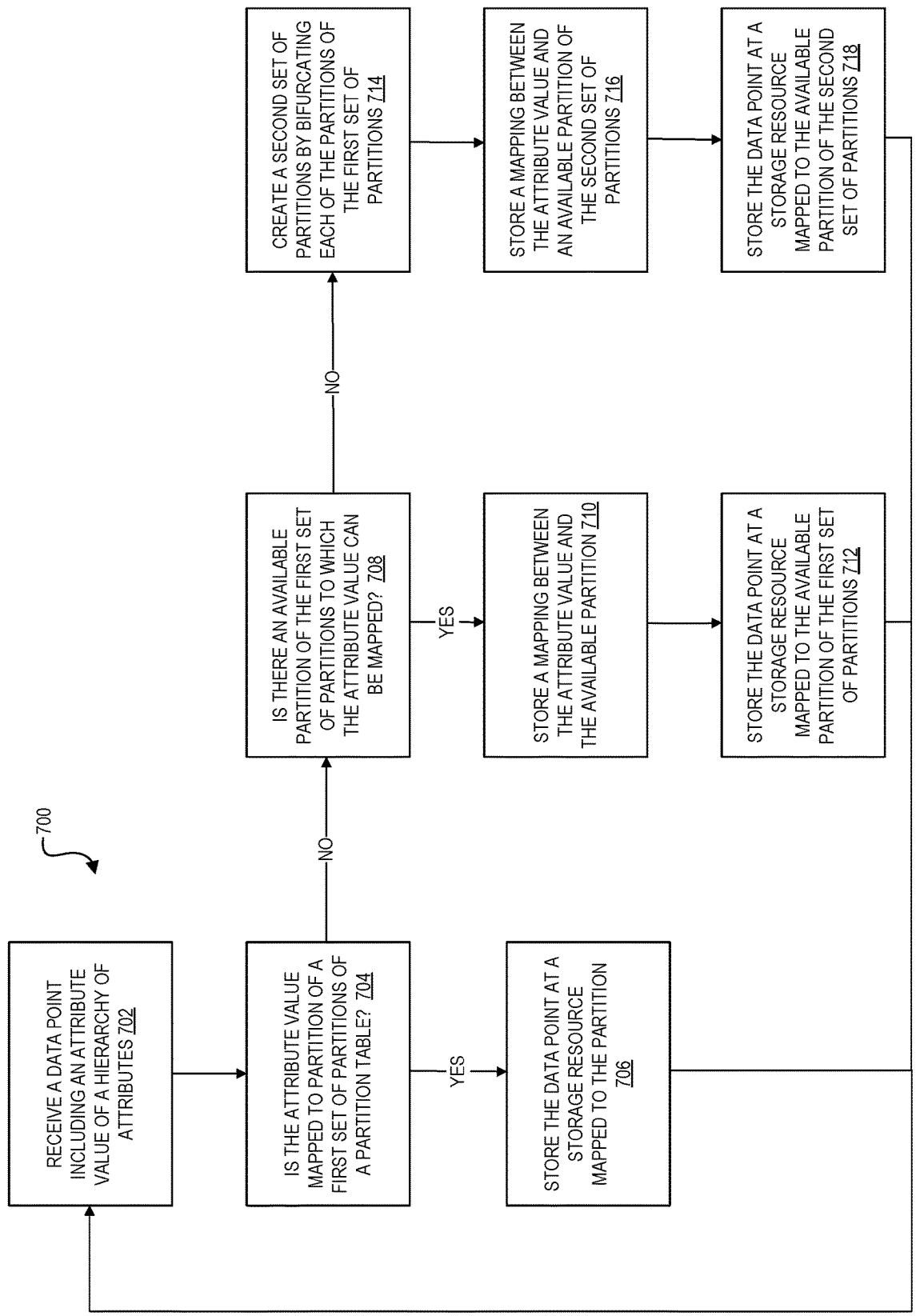
FIG. 7 is a flow diagram illustrating operations of a method for clustering data at the point of ingestion for storage using scalable storage resources according to some embodiments.

FIG. 7 is a flow diagram illustrating operations 700 for clustering data at the point of ingestion for storage using scalable storage resources according to some embodiments. Some or all of the operations 700 (or other processes described herein, or variations, and/or combinations thereof) are performed under the control of one or more computer systems configured with executable instructions and are implemented as code (for example, executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 700 are performed by an ingestion router 110 of the other figures.

The operations 700 include, at block 702, receiving a data point including an attribute value of a hierarchy of attributes. As described in reference to FIG. 1, an ingestion router 110 can receive data points from one or more data producers 102 over one or more intermediate networks 112. The hierarchy of attributes can include any number of separate attributes associated with the data and generally represents a data "drill path" that can be used to group the data at varying levels of data granularity. In an embodiment, each received data point is associated with a plurality of attribute values representing a hierarchy of data attributes, and a separate partition table is generated for each data attribute of the hierarchy of data attributes. In an embodiment, generating the partition tables used to cluster the plurality of data points is performed during ingestion of the plurality of data points. In an embodiment, the data point is a time series data point including a respective time value, and a plurality of data points are received in chronological order.

The operations 700 further include, at block 704, determining whether the attribute value is mapped to a partition of a first set of partitions of a partition table. For example, as described in relation to the example partition table 300 in FIG. 3, an attribute value-to-partition mapping table can be examined to determine whether any of the partitions at a current level of a partition table are mapped to the attribute value identified in the data.

The operations 700 further include, at block 706, if the attribute value is mapped to a partition, storing the data point at a storage resource mapped to the partition. If the attribute value is not mapped to a partition of the first set of partitions, at block 708, it is determined whether there is an available partition of the first set of partitions to which the attribute value can be mapped. For example, an attribute value-to-partition mapping table can be examined to determine whether there are any partitions at the current level of the partition table that are not assigned to another value.

The operations 700 further include, at block 710, if there is an available partition of the first set of partitions to which the attribute value can be mapped, storing a mapping between the attribute value and the available partition and, at block 712, storing the data point at a storage resource mapped to the available partition of the first set of partitions. In an embodiment, the available partition is mapped to one or more physical storage resources based at least in part on a throughput measurement determined for the available partition. In an embodiment, the second set of partitions are mapped to a set of physical storage resources based on an even distribution of the set of physical storage resources to the second set of partitions. In an embodiment, the data points are stored using a tiered set of storage resources, each tier of the tiered set of storage resources associated with different performance characteristics.

The operations 700 further include, at block 714, if it is determined at block 710 that there is not an available partition of the first set of partitions to which the attribute value can be mapped, creating a second set of partitions by bifurcating (or otherwise re-segmenting) each of the partitions of the first set of partitions and, at block 716, storing a mapping between the attribute value and an available partition of the second set of partitions. In one embodiment, a partition of the first set of partitions and a partition of the second set of partitions are each associated with a same partition identifier, and the partition of the second set of partitions is associated with a subrange of the partition of the first set of partitions. In an embodiment, creating the second set of partitions includes determining that a number of sets of partitions does not exceed a maximum number of sets of partitions (for example, to ensure that one of the attributes is not associated with an unbounded number of attribute values).

In one embodiment, the first set of partitions is associated with a first time value indicating an earliest data point associated with the first set of partitions, and the second set of partitions is associated with a second time value indicating an earliest data point associated with the second set of partitions.

The operations 700 further include, at block 718, storing the data point at a storage resource mapped to the available partition of the second set of partitions. In an embodiment, once the data point is stored to the storage resource at either block 706, 712, or 718, the process returns to block 702 to await receipt of a subsequent data point.

In an embodiment, a query is received specifying at least one attribute value and a time range. Based on the partition table, one or more physical storage resources storing data associated with the at least one attribute value and the time range are identified, and the query is processed using the one or more physical storage resources.

Figure 8:
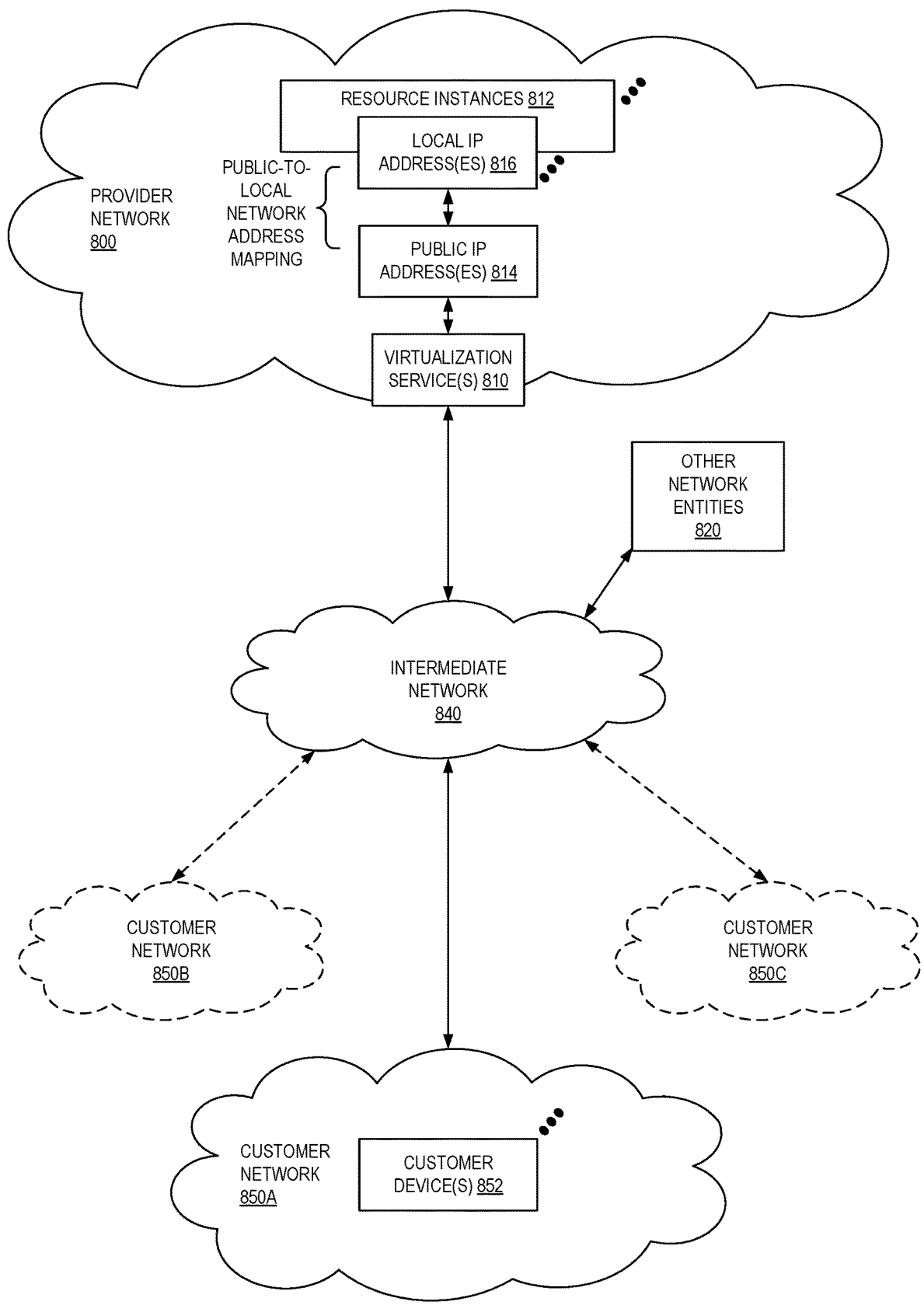
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
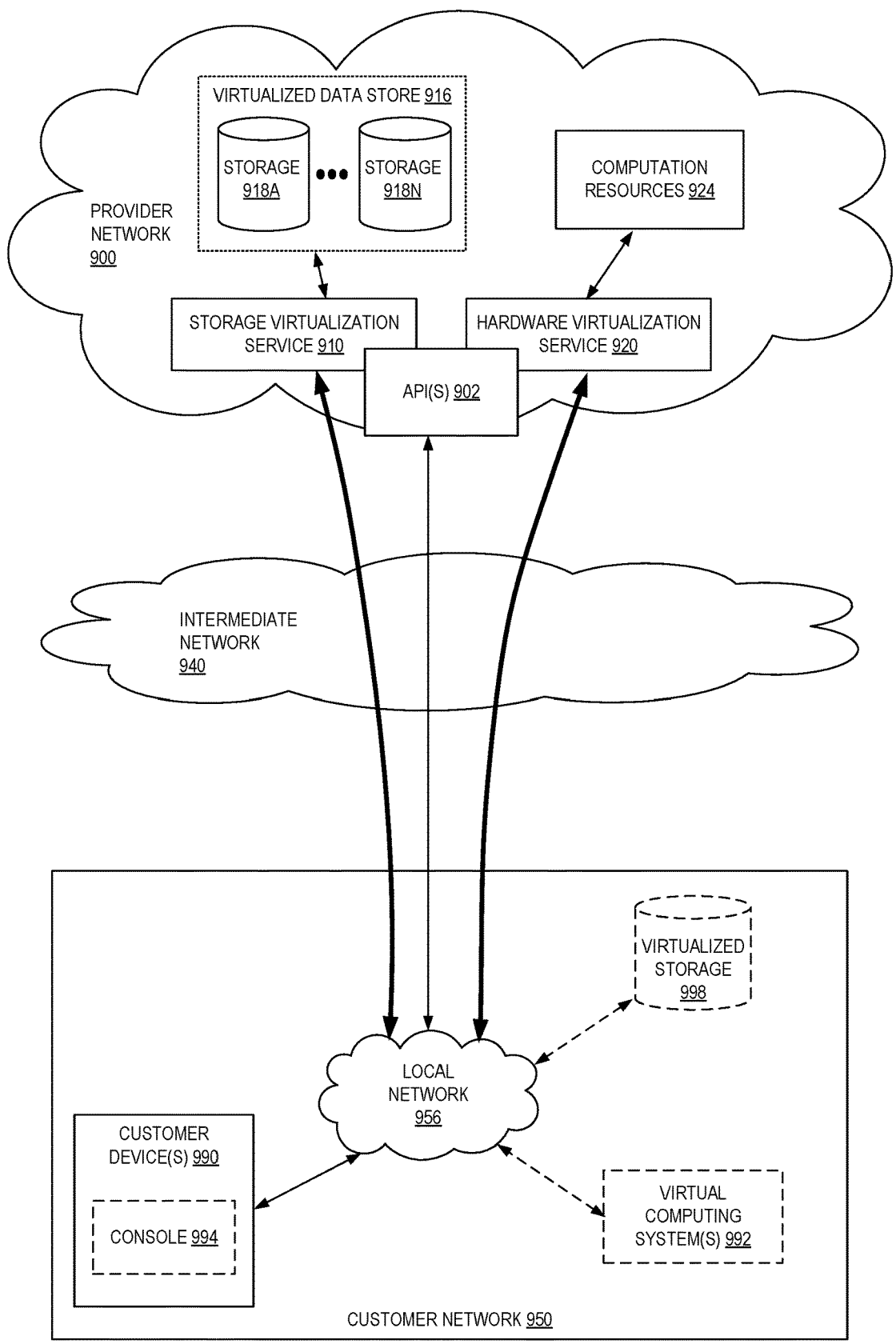
FIG. 9 is a block diagram of an example provider network that provides a storage virtualization service and a hardware virtualization service to customers according to some embodiments.

FIG. 9 is a block diagram of an example provider network that provides a storage virtualization service and a hardware virtualization service to customers, according to some embodiments. Hardware virtualization service 920 provides multiple computation resources 924 (e.g., VMs) to customers. The computation resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the computation resources 924 to public Internet destinations, and from public Internet sources to the local IP addresses of computation resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage virtualization service 910, for example via one or more APIs 902, to access data from and store data to storage resources 918A-918N of a virtual data store 916 provided by the provider network 900. In some embodiments, a virtualized data store gateway (not shown) may be provided at the customer network 950 that may locally cache at least some data, for example frequently accessed or critical data, and that may communicate with virtualized data store service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes, which appear to the user as local virtualized storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Figure 10:
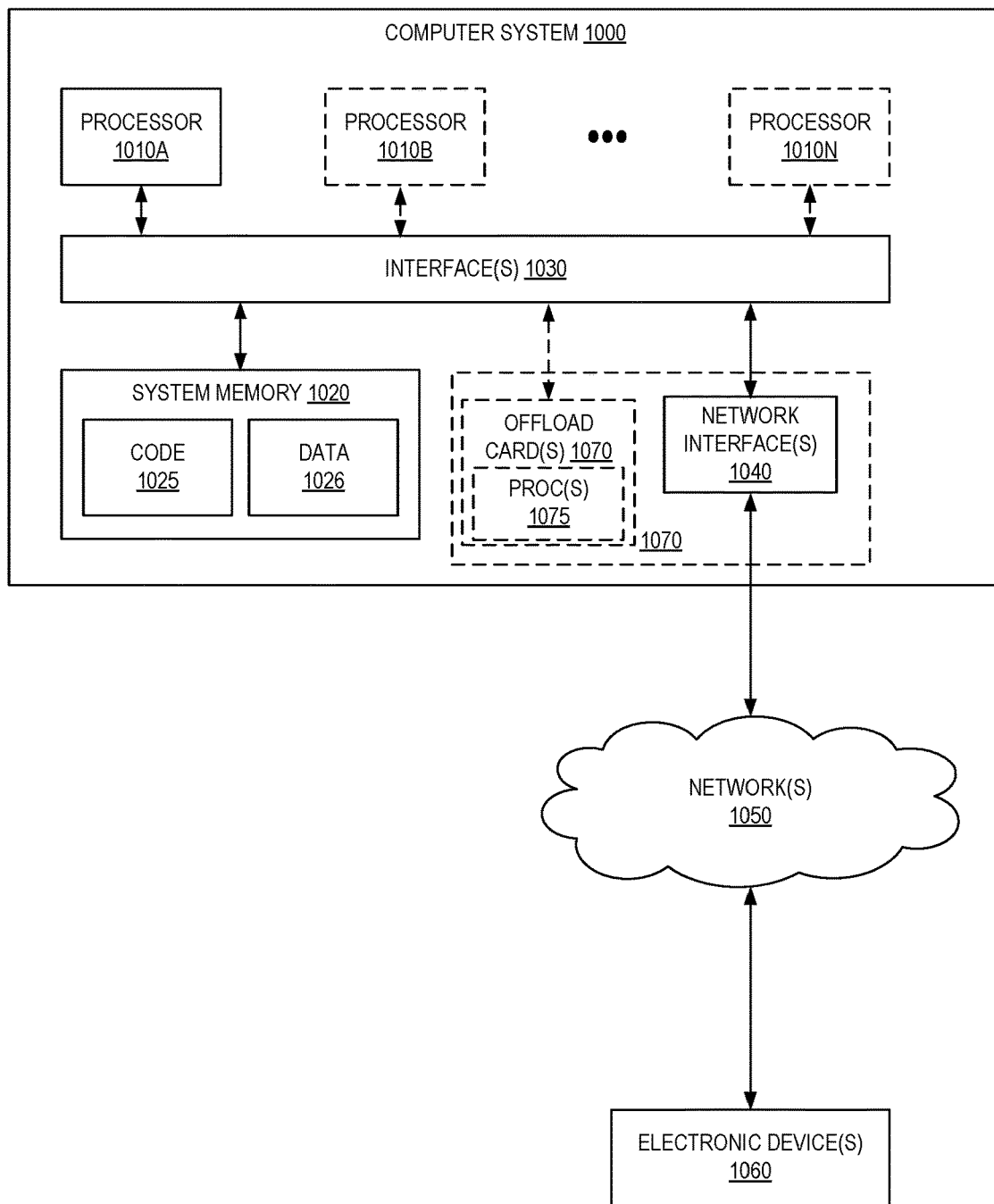
FIG. 10 is a block diagram illustrating an example computer system that may be used in some embodiments.

In some embodiments, a system that implements a portion or all of the techniques for clustering data as described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1020 as code 1025 and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070 (including one or more processors 1075, and possibly including the one or more network interfaces 1040) that are connected using an I/O interface 1030 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute instances, and the one or more offload cards 1070 execute a virtualization manager that can manage compute instances that execute on the host electronic device. As an example, in some embodiments the offload card(s) 1070 can perform compute instance management operations such as pausing and/or un-pausing compute instances, launching and/or terminating compute instances, performing memory transfer/copying operations, etc. These management operations may, in some embodiments, be performed by the offload card(s) 1070 in coordination with a hypervisor (e.g., upon a request from a hypervisor) that is executed by the other processors 1010A-1010N of the computer system 1000. However, in some embodiments the virtualization manager implemented by the offload card(s) 1070 can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (for example, 204A-204D) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," and so forth, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (for example, A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
generating a partition table used to cluster a plurality of data points based on attribute values associated with the plurality of data points, wherein the partition table is used to cluster the plurality of data points based on attribute values associated with one attribute of a hierarchy of attributes included with the plurality of data points, and wherein the partition table includes a first set of partitions defining a first segmentation of a total range of ordered values;
receiving a data point including an attribute value;
determining that the first set of partitions does not include a partition mapped to the attribute value and that there is not an available partition of the first set of partitions to which the attribute value can be mapped;
generating a second set of partitions by bifurcating each partition of the first set of partitions, the second set of partitions defining a second segmentation of the total range of ordered values;
mapping the attribute value to an available partition of the second set of partitions;
mapping the available partition of the second set of partitions to one or more physical storage resources; and
storing the data point at the one or more physical storage resources.

2. The computer-implemented method of claim 1, wherein a partition of the first set of partitions and a partition of the second set of partitions are each associated with a same partition identifier, and wherein the partition of the second set of partitions is associated with a subrange of the partition of the first set of partitions.

3. The computer-implemented method of claim 1, wherein the first set of partitions is associated with a first time value indicating an earliest data point associated with the first set of partitions, and wherein the second set of partitions is associated with a second time value indicating an earliest data point associated with the second set of partitions.

4. The computer-implemented method of claim 1, wherein each data point of the plurality of data points is associated with a plurality of attribute values representing a hierarchy of data attributes, and wherein a separate partition table is generated for each data attribute of the hierarchy of data attributes.

5. The computer-implemented method of claim 1, further comprising:
receiving a query specifying at least one attribute value and a time range;
identifying, based on the partition table, one or more physical storage resources storing data associated with the at least one attribute value and the time range; and
processing the query using the one or more physical storage resources.

6. The computer-implemented method of claim 1, wherein generating the partition table used to cluster the plurality of data points is performed during ingestion of the plurality of data points.

7. The computer-implemented method of claim 1, wherein the available partition is mapped to one or more physical storage resources based at least in part on a throughput measurement determined for the available partition.

8. The computer-implemented method of claim 1, wherein the second set of partitions are mapped to a set of physical storage resources based on an even distribution of the set of physical storage resources to the second set of partitions.

9. The computer-implemented method of claim 1, wherein each of the plurality of data points is a time series data point including a respective time value, and wherein the plurality of data points are received in chronological order.

10. The computer-implemented method of claim 1, wherein the data points are stored using a tiered set of storage resources, each tier of the tiered set of storage resources associated with different performance characteristics.

11. A computer-implemented method comprising:
   generating a partition table used to cluster a plurality of time series data points during ingestion of the plurality of time series data points, wherein the partition table is used to cluster the plurality of time series data points based on attribute values associated with one attribute of a hierarchy of attributes included with the plurality of time series data points, the partition table including a first set of partitions defining a first segmentation of a total range of ordered values, wherein each partition of the first set of partitions can be mapped to a single attribute value of a plurality of attribute values associated with the plurality of time series data points;
   receiving a time series data point generated by a computing device;
   identifying an attribute value associated with the time series data point;
   determining that the first set of partitions does not include a partition mapped to the attribute value and that there is not an available partition of the first set of partitions to which the attribute value can be mapped;
   generating a second set of partitions by bifurcating a subrange associated with each partition of the first set of partitions, the second set of partitions defining a second segmentation of the total range of ordered values;
   mapping the attribute value to an available partition of the second set of partitions;
   mapping the available partition of the second set of partitions to one or more physical storage resources; and
   storing the time series data point at the one or more physical storage resources.

12. The computer-implemented method of claim 11, wherein a partition of the first set of partitions and a partition of the second set of partitions are each associated with a same partition identifier, and wherein the partition of the second set of partitions is associated with a subrange of the partition of the first set of partitions.

13. The computer-implemented method of claim 11, wherein the first set of partitions is associated with a first time value indicating an earliest time series data point associated with the first set of partitions, and wherein the second set of partitions is associated with a second time value indicating an earliest time series data point associated with the second set of partitions.

14. A system comprising:
   an ingestion router implemented by a first one or more electronic devices, the ingestion router including instructions that upon execution cause the ingestion router to:
      generate a partition table used to cluster a plurality of data points based on attribute values associated with the plurality of data points, wherein the partition table is used to cluster the plurality of data points based on attribute values associated with one attribute of a hierarchy of attributes included with the plurality of data points, the partition table including a first set of partitions defining a first segmentation of a total range of ordered values;
      receive a data point including an attribute value;
      determine that the first set of partitions does not include a partition mapped to the attribute value and that there is not an available partition of the first set of partitions to which the attribute value can be mapped;
      generate a second set of partitions by bifurcating each partition of the first set of partitions, the second set of partitions defining a second segmentation of the total range of ordered values;
      map the attribute value to an available partition of the second set of partitions;
      map the available partition of the second set of partitions to one or more physical storage resources of a storage service; and
      send the data point for storage by the storage service;
   the storage service implemented by a second one or more electronic devices, the storage service including instructions that upon execution cause the storage to:
      receive the data point; and
      store the data point at the one or more physical storage resources mapped to the available partition of the second set of partitions.

15. The system of claim 14, wherein a partition of the first set of partitions and a partition of the second set of partitions are each associated with a same partition identifier, and wherein the partition of the second set of partitions is associated with a subrange of the partition of the first set of partitions.

16. The system of claim 14, wherein the first set of partitions is associated with a first time value indicating an earliest data point associated with the first set of partitions, and wherein the second set of partitions is associated with a second time value indicating an earliest data point associated with the second set of partitions.

17. The system of claim 14, wherein each data point of the plurality of data points is associated with a plurality of attribute values representing a hierarchy of data attributes, and wherein a separate partition table is generated for each data attribute of the hierarchy of data attributes.

18. The system of claim 14, wherein generating the partition table used to cluster the plurality of data points is performed during ingestion of the plurality of data points.

19. The system of claim 14, wherein the available partition is mapped to one or more physical storage resources based at least in part on a throughput measurement determined for the available partition.

* * * * *